United States Patent [19]

Liu et al.

[11] Patent Number: 4,579,903
[45] Date of Patent: Apr. 1, 1986

[54] COPOLYESTER-CARBONATE COMPOSITION

[75] Inventors: Ping Y. Liu, Naperville, Ill.; Edward L. Belfoure, New Harmony, Ind.

[73] Assignee: General Electric Company, Mt. Vernon, Ind.

[21] Appl. No.: 683,663

[22] Filed: Dec. 19, 1984

[51] Int. Cl.$^4$ ............................................. C08L 73/00
[52] U.S. Cl. ..................................... 524/508; 524/164; 525/67; 525/92; 525/146; 525/901
[58] Field of Search ............... 525/92, 146, 901, 940, 525/439, 67; 524/508, 164

[56] References Cited

U.S. PATENT DOCUMENTS 4,481,331 11/1984 Liu ........................................ 525/901

*Primary Examiner*—Theodore E. Pertilla
*Attorney, Agent, or Firm*—Myron B. Kapustij; Martin B. Barancik

[57] ABSTRACT

Copolyester-carbonate composition exhibiting improved resistance to organic solvents comprising, in admixture:

(i) at least one aromatic copolyester-carbonate resin;
(ii) at least one aromatic polycarbonate resin;
(iii) at least one selectively hydrogenated block copolymer of a vinyl aromatic compound and an olefinic elastomer; and
(iv) at least one polymer selected from an olefin acrylate copolymer, an olefin diene terpolymer, or mixtures thereof. The instant composition also exhibits improved impact properties and relatively high heat resistance.

30 Claims, No Drawings

COPOLYESTER-CARBONATE COMPOSITION

BACKGROUND OF THE INVENTION

Copolyester-carbonate resins are well known commercially available materials which, due to their many advantageous properties are finding increasing use as thermoplastic engineering materials. Such copolyester-carbonates may be prepared by the reaction of a dihydric phenol, a carbonate precursor, and an ester precursor. The copolyester-carbonates exhibit high heat resistance, good dimensional stability, good tensile strengths, and good impact strengths. However, in certain applications the use of aromatic copolyester-carbonates is severely limited due to their relatively poor resistance to organic solvents such as, for example, gasoline, acetone, heptane, and carbon tetrachloride. The most significant effect of this poor solvent resistance is a loss in vital impact strength and also an increase in brittle type failure of parts fabricated from copolyester-carbonates which have been exposed to these organic solvents. Contact with such solvents may occur, for example, when parts are used under the hood of automobiles or near the gasoline filler ports thereof, or when solvents are used to clean or degrease stressed parts made from copolyester-carbonate resin.

In certain applications materials exhibiting both better organic solvent resistance and higher impact strengths than those exhibited by conventional copolyester-carbonates are required.

It is an object of the instant invention to provide copolyester-carbonate compositions exhibiting improved resistance to organic solvents such as gasoline, i.e., improved environmental stress crazing and cracking properties, and better impact strength than exhibited by copolyester-carbonate resins.

SUMMARY OF THE INVENTION

The instant invention is directed to copolyester-carbonate resin compositions exhibiting improved resistance to environmental stress crazing and cracking, and improved impact strength. These copolyester-carbonate resin compositions are comprised of, in physical admixture:

(i) at least one high molecular weight thermoplastic aromatic copolyester-carbonate resin;
(ii) at least one high molecular weight thermoplastic aromatic polycarbonate resin;
(iii) at least one selectively hydrogenated linear, sequential or radial teleblock copolymer of a vinyl aromatic compound $(A)_n$ and $(A')_n$ and an olefinic elastomer (B) of the type A-B-A', A-(B-A-B)$_n$-A, A(BA)$_n$B, (A)$_4$B, B(A)$_4$ or B((AB)$_n$B)$_4$ wherein n is an integer of from 1 to 10; and
(iv) at least one compound selected from an olefin-acrylate copolymer or an olefin-rubbery diene terpolymer; components (ii)–(iv) being present in in amounts effective to improve the impact properties and organic solvent resistance of the copolyester-carbonate resin.

DESCRIPTION OF THE INVENTION

In accordance with the instant invention there are provided copolyester-carbonate resin compositions exhibiting improved resistance to organic solvents and improved impact properties, e.g., improved impact strength. These compositions comprise, in physical admixture:

(i) at least one high molecular weight thermoplastic aromatic copolyester-carbonate resin;
(ii) at least one high molecular weight thermoplastic aromatic polycarbonate resin;
(iii) at least one selectively hydrogenated linear, sequential or radial teleblock copolymer of a vinyl aromatic compound (A) and (A') and an olefinic elastomer (B) of the type A-B-A', A-(B-A-B)$_n$-A, A(BA)$_n$B, (A)$_4$B, B(A)$_4$ or B((AB)$_n$B)$_4$ wherein n is an integer having a value from 1 to 4 inclusive; and
(iv) at least one polymer selected from
   (a) a copolymer of an olefin and at least one of a $C_1$–$C_6$ alkyl acrylate, a $C_1$–$C_6$ alkyl methacrylate, acrylic acid, methacrylic acid, or mixtures thereof, and
   (b) An olefin-rubbery diene terpolymer; components (ii)–(iv) being present in amounts effective to improve the impact properties and resistance to organic solvents, such as gasoline, of said copolyester-carbonate resin.

Briefly stated the high molecular weight thermoplastic aromatic copolyester-carbonates comprise recurring carbonate groups, carboxylate groups, and aromatic carbocyclic groups in the polymer chain in which at least some of the carbonate groups and at least some of the carboxylate groups are bonded directly to the ring carbon atoms of the aromatic carbocyclic groups.

These copolyester-carbonates contain ester bonds and carbonate bonds in the chain, wherein the amount of the ester bonds (ester content) is in the range of from about 25 to about 90 mole percent, preferably from about 35 to about 80 mole percent ester bonds (ester content). For example, 5 moles of bisphenol-A reacting completely with 4 moles of isophthaloyl dichloride and 1 mole of phosgene would give a copolyester-carbonate of 80 mole percent ester bonds (ester content).

The copolyester-carbonates of the instant invention, as well as methods for their preparation, are disclosed, inter alia, in U.S. Pat. Nos. 3,169,121, 4,238,596, 4,156,069, and 4,238,597, all of which are hereby incorporated herein by reference.

The copolyester-carbonates may be prepared by a variety of methods including melt polymerization, transesterification, and the interfacial polymerization process.

These copolyester-carbonates may be readily prepared by the reaction of (i) at least one dihydric phenol, (ii) a carbonate precursor, and (iii) at least one ester precursor.

The dihydric phenols useful in the preparation of the instant copolyester-carbonates may be represented by the general formula

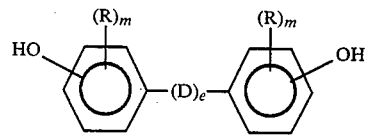

wherein:
R is independently selected from halogen and monovalent hydrocarbon radicals;
D is selected from divalent hydrocarbon radicals,

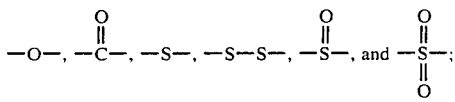

m is independently selected from integers having a value of from 0 to 4 inclusive; and e is either zero or one.

The monovalent hydrocarbon radicals represented by R include the alkyl, cycloalkyl, aryl, aralkyl, and alkaryl radicals. Preferred alkyl radicals are those containing from 1 to about 10 carbon atoms. Preferred cycloalkyl radicals are those containing from 4 to about 8 ring carbon atoms. Preferred aryl radicals are those containing from 6 to 12 ring carbon atoms, i.e., phenyl, naphthyl, and biphenyl. Preferred aralkyl and alkaryl radicals are those containing from 7 to about 14 carbon atoms.

The divalent hydrocarbon radicals represented by D include alkylene, cycloalkylene, alkylidene, and cycloalkylidene radicals. The preferred alkylene radicals are those containing from 2 to about 20 carbon atoms. The preferred alkylidene radicals are those containing from 1 to about 20 carbon atoms. The preferred cycloalkylidene and cycloalkylene radicals are those containing from 4 to about 16 ring carbon atoms.

Some illustrative non-limiting examples of the dihydric phenols falling within the scope of Formula I include:

2,2-bis(4-hydroxyphenyl)propane (bisphenol-A);
1,1-bis(4-hydroxyphenyl)propane;
1,5-bis(4-hydroxyphenyl)pentane;
1,1-bis(4-hydroxyphenyl)decane;
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3-methyl-5-chloro-4-hydroxyphenyl)cyclohexane;
1,3-bis(4-hydroxyphenyl)propane;
bis(4-hydroxyphenyl)ether;
p,p'-dihydroxydiphenyl;
4,4'-thiodiphenol; and
bis(3,5-diisopropyl-4-hydroxyphenyl)sulfone.

Other useful dihydric phenols are disclosed in U.S. Pat. Nos. 3,169,121, 2,999,835, 3,027,365, 3,334,154, 3,035,021, 3,036,036, 3,036,037, 3,036,038, 3,036,039 and 4,111,910, all of which are incorporated herein by reference.

It is, of course, possible to employ a mixture of two or more different dihydric phenols as well as individual dihydric phenols in the preparation of the instant copolyester-carbonates.

The preferred dihydric phenols are the 4,4'-bisphenols.

The carbonate precursor may be a carbonyl halide, a carbonate ester, or a bishaloformate. The carbonyl halides which may be employed herein are carbonyl bromide, carbonyl chloride, and mixtures thereof. Typical carbonate esters which may be employed are diphenyl carbonate; di(halophenyl) carbonates such as di(chlorophenyl)carbonate, di(bromophenyl)carbonate, di(trichlorophenyl) carbonate, etc.; di(alkylphenyl)carbonates such as di(tolyl)carbonate, etc.; phenyl tolyl carbonate; chlorophenyl chloronaphthyl carbonate, etc., or mixtures thereof. The bishaloformates suitable for use herein include the bishaloformates of dihydric phenols such as the bischloroformates of hydroquinone, bischloroformate of bisphenol-A, and the like; or bishaloformates of glycols such as the bischloroformates of ethylene glycol, polyethylene glycol, neopentyl glycol, and the like. The preferred carbonate precursor is carbonyl chloride, also known as phosgene.

The ester precursor may be a difunctional carboxylic acid or, preferably, the ester forming reactive derivative of the difunctional carboxylic acid. In general, any difunctional carboxylic acid, and preferably any ester forming reactive derivative thereof, conventionally used in the preparation of linear polyesters may be utilized in the preparation of the instant copolyester-carbonates. In general the difunctional carboxylic acids, preferably their ester forming reactive derivatives, include the aliphatic carboxylic acids, the aromatic carboxylic acid, and the aliphatic-aromatic carboxylic acids, and their ester forming reactive derivatives. Some useful difunctional carboxylic acids are disclosed in U.S. Pat. No. 3,169,121, which is hereby incorporated herein by reference.

Particularly useful difunctional carboxylic acids, preferably the ester forming reactive derivatives thereof, are the difunctional aromatic carboxylic acids.

The preferred ester forming reactive derivatives of the difunctional aromatic carboxylic acids are the acid dihalides, preferably the acid dichlorides. Some illustrative non-limiting examples of these derivatives are isophthaloyl dichloride, terephthaloyl dichloride, and mixtures thereof. A particularly useful mixture of the ester forming reactive derivatives of isophthalic acid and terephthalic acid is one which contains, in a weight ratio, from about 1:10 to about 9.8:0.2 of isophthaloyl dichloride to terepthaloyl dichloride.

Particularly useful copolyester-carbonates are those containing from about 70 to about 80 mole percent ester content, said ester content being comprised of from about 1 to about 10 mole percent residues of terephthaloyl dichloride and from about 90 to about 99 mole percent residues of isophthaloyl dichloride. In these copolyestercarbonates the carbonate precursor is preferably phosgene and the dihydric phenol is preferably bisphenol-A.

A particularly useful method of preparing the copolyester-carbonates of the instant invention is the interfacial polymerization process utilizing an aqueous caustic solution, a water immiscible organic solvent such as methylene chloride, a catalyst, and a molecular weight regulator.

The catalysts which may be employed are any of the well known catalysts which catalyze the copolyester-carbonate forming reaction. These catalysts include, but are not limited to, tertiary amines such as triethylamine, tripropylamine, N,N-dimethylaniline, quaternary phosphonium compounds, and quaternary ammonium compounds.

The molecular weight regulators are any of the known compounds that regulate the molecular weight of the copolyester-carbonate by a chain terminating mechanism. These compounds include, but are not limited to, phenol, tertiarybutyl phenol, and chroman-I.

The instant copolyester-carbonates will have a weight average molecular weight in the range of from about 20,000 to about 200,000, and preferably from about 25,000 to about 100,000.

Also included within the scope of the instant invention are the thermoplastic randomly branched high molecular weight aromatic copolyester-carbonates.

These randomly branched copolyester-carbonates are derived from (i) a dihydric phenol, (ii) a carbonate precursor, (iii) an ester precursor, and (iv) a minor amount of a branching agent. The branching agents are well known compounds and are generally aromatic compounds containing at least three functional groups which may be hydroxyl, carboxyl, carboxylic anhydride, haloformyl, or mixtures thereof. Some illustrative non-limiting examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like.

Also included herein are blends of linear and branched copolyester-carbonates.

The high molecular weight thermoplastic aromatic polycarbonates which form component (ii) of the instant compositions are well known materials which are generally commercially available. These polycarbonates, as well as methods for their preparation, are disclosed, inter alia, in U.S. Pat. Nos. 2,999,835, 3,028,365, 3,275,601, 3,334,154, and 3,989,672, all of which are hereby incorporated herein by reference.

These polycarbonates may be conveniently prepared via the interfacial polymerization process by reacting at least one dihydric phenol of Formula I with a carbonate precursor such as phosgene.

These polycarbonates contain recurring structural units represented by the general formula

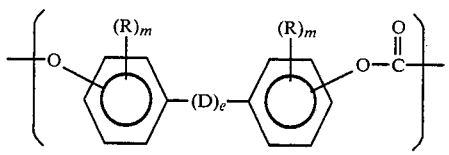

II.

wherein R, D, e, and m are as defined hereinafore.

The instant polycarbonate have a weight average molecular weight of from about 20,000 to about 200,000, and preferably from about 25,000 to about 100,000. It is generally preferred that the instant polycarbonates have an intrinsic viscosity of at least about 0.4 dl./gm. in methylene chloride at 25° C.

Also included herein are the randomly branched high molecular weight thermoplastic aromatic polycarbonates derived from a dihydric phenol, a carbonate precursor, and a branching agent of the types described hereinafore.

The selectively hydrogenated linear, sequential or radial teleblock copolymers which form component (iii) of the instant invention are well known in the art, are generally commercially available, and may be readily prepared by means known in the art.

Prior to hydrogenation, the end blocks of these polymers comprise homopolymers or copolymers preferably prepared from alkenyl aromatic hydrocarbons and particularly vinyl aromatic hydrocarbon wherein the aromatic moiety may be either monocyclic or polycyclic. Typical monomers include styrene, alpha methyl styrene, p-methyl styrene, vinyl xylene, ethyl vinyl xylene, vinyl naphthylene, and the like, or mixtures thereof. The end blocks (A) and (A') may be the same or different. They are preferably selected from styrene, alpha-methyl styrene, vinyl toluene, vinyl xylene, vinyl naphthylene, and especially styrene. The center block (B) may be derived from, for example, butadiene, isoprene, 1,3-pentadiene, 2,3-dimethylbutadiene, and the like, and it may have a linear, sequential or teleradial structure.

The selectively hydrogenated linear block copolymers are described by Haefele et al., U.S. Pat. No. 3,333,024, which is hereby incorporated herein by reference.

The ratio of the copolymers and the average molecular weights can vary broadly although the molecular weight of the center block should be greater than that of the combined terminal blocks. It is preferred to form terminal blocks A each having a weight average molecular weight of about 2,000 to about 60,000 and center block B, e.g., a hydrogenated polybutadiene block with a weight average molecular weight of about 20,000 to 450,000. Still more preferably, the terminal blocks each have a weight average molecular weight of about 7,000 to 35,000 while the hydrogenated polybutadiene polymer blocks have a weight average molecular weight between about 30,000 and 150,000. The terminal blocks will preferably comprise about 20 to 45% by weight, or more, preferably about 25 to 40 weight percent, of the total block copolymer. The preferred copolymers will be those having a polybutadiene center block wherein 35 to 55% of the butadiene block segment is the structure resulting from 1,2 addition.

The hydrogenated copolymers will have the average unsaturation reduced to less than 20% of the original value. It is preferred to have the unsaturation of the center block B reduced to 10% or less, preferably 5% or less of its original value. After hydrogenation, center blocks B derived from isoprene will have the ethylenebutylene structure.

The block copolymers are formed by techniques well known to those skilled in the art. Hydrogenation may be conducted utilizing a variety of known hydrogenation catalysts such as nickel on kieselguhr, Raney nickel, copper chromate, molybdenum sulfide and finely divided platinum or other noble metals on a low surface area carrier.

Hydrogenation may be conducted at any desired temperature or pressure, from atmospheric to 3,000 psig, the usual range being between 100 and 1,000 psig at temperatures from 75° F. to 600° F. for times between 0.1 and 24 hours, preferably from 0.2 to 8 hours.

Hydrogenated block copolymers such as Kraton G-1650 and Kraton G-1651 from Shell Chemical Company, Polymers Division, have been found useful according to the present invention. Also useful are the Solprenes of Phillips.

The radial teleblock copolymers of which the Solprenes are typical examples can be characterized as having at least three polymer branches with each branch of the radial block polymer comprising terminal non-elastomeric segments, e.g., (A) and (A') as defined hereinafore. The branches of the radial block polymer contain a terminal nonelastomeric segment attached to an elastomeric polymer segment, e.g., (B) as defined hereinafore. These are described in Marrs, U.S. Pat. No. 3,753,936 and in Zelinski, U.S. Pat. No. 3,281,282, both of which are incorporated herein by reference, and they are selectively hydrogenated by procedures known per se. In any event, the term "selective hydrogenation" is used herein to contemplate polymers in which the elastomeric blocks (A) and (A') have been left unhydrogenated, i.e. aromatic.

The olefin-acrylate which comprises component (iv) of the instant compositions is made from an olefin, e.g., ethylene, propylene, or the like, copolymerized with one or more of a comonomer comprising a $C_1$–$C_6$ alkyl acrylate, e.g., methyl acrylate, ethyl acrylate, hexyl acrylate and the like; a $C_1$–$C_6$ alkyl methacrylate, e.g., methyl methacrylate, ethyl methacrylate, hexyl methacrylate, and the like; acrylic acid; or methacrylic acid. Especially preferred are the well known copolymers of ethylene with an alkyl ester of acrylic acid. These are disclosed in U.S. Pat. No. 2,953,551, which is hereby incorporated herein by reference. Generally, the acrylate or methacrylate portion of the copolymer can range from 10 to about 30 weight percent. The olefin portion of the copolymer can range from about 70 to about 90 weight percent. The preferred copolymer for use as component (iv) is an ethylene-ethyl acrylate copolymer in which the weight ratio of the ethylene fraction to the ethyl acrylate fraction is about 4.5 to 1. Suitable olefin-acrylate copolymers, as defined above, can be prepared by methods well known to those skilled in the art or can be obtained commercially. For example, Union Carbide's Bakelite DPD-6169 ethylene-ethyl acrylate copolymer is suitable for use in the present invention.

The olefin-rubbery diene polymers which comprise component (iv) of the instant compositions are well known in the art and are generally commercially available or may be readily prepared by known methods. They may be readily prepared by the reaction of an olefin with a rubbery diene. The olefins which may be reacted with the dienes are the known olefins as described hereinafore, preferably the lower olefins such as ethylene, propylene, butylene, and the like, and more preferably ethylene and propylene. The dienes include the norbornenes such as norbornene and ethylidene norbornene, butadiene, pentadiene, isoprene, cyclopentadiene, cyclohexadiene, and the like. Preferred olefin-diene polymers are the terpolymers formed by the reaction of two olefins with a rubbery diene. Particularly useful terpolymers are those of the EPDM family such as the ethylene propylene diene terpolymer. Some illustrative non-limiting examples of the EPDM type terpolymers are ethylene propylene norbornene, ethylene propylene ethylidene norbornene, ethylene propylene butadiene, ethylene propylene pentadiene, ethylene propylene cyclopentadiene, and the like. These EPDM type terpolymers are well known in the art and are generally commercially available from several sources such as, for example, Epsyn 704 from Copolymer Rubber, and the Vistalon series from Exxon Chemicals such as Vistalon 3708, Vistalon 2504, and the like.

The amounts of components (ii), (iii) and (iv) present in the instant compositions are amounts which are effective to positively upgrade the environmental stress crazing and cracking properties, i.e., resistance to organic solvents, and to positively upgrade the impact strengths of the instant compositions. Greater than these amounts of components (ii)—(iv) may be employed so long as the properties desired for a particular application of these compositions are substantially maintained. That is to say, the amounts of components (ii)-(iv) present in the instant compositions are amounts effective to improve the environmental stress crazing and cracking properties and the impact properties of the instant compositions but insufficient to significantly deleteriously affect substantially most of the other advantageous properties thereof.

Generally a minimum of about 10 weight percent of component (ii), a minimum of about 2 weight percent of component (iii), and a minimum of about 1 weight percent of component (iv) are sufficient to observe an improvement in organic solvent resistance and an improvement in impact strength of the copolyester-carbonate. A minimum of about 15 weight percent of component (ii), a minimum of about 4 weight percent of component (iii), and a minimum of about 2 weight percent of component (iv) are preferred; while a minimum of about 20 weight percent of component (ii), a minimum of about 5 weight percent of component (iii), and a minimum of about 3 weight percent of component (iv) are more preferred. A level of about 75 weight percent of component (ii), about 25 weight percent of component (iii), and about 20 weight percent of component (iv) should generally not be exceeded; preferably a level of about 70 weight percent of component (ii), about 20 weight percent of component (iii), and about 15 weight percent of component (iv); and more preferably a level of about 60 weight percent of component (ii), about 15 weight percent of component (iii), and about 10 weight percent of component (iv).

Weight percent is measured as the amounts of components (ii), (iii) and (iv) in the total of components (i), (ii), (iii) and (iv).

The instant composition generally contain a minimum of about 20 weight percent of component (i), i.e., the copolyester-carbonate resin, preferably a minimum of about 25 weight percent of component (i), and more preferably about 30 weight percent of component (i). Weight percent of component (i) is measured as the amount of component (i) present in the total of components (i), (ii), (iii), and (iv).

The compositions of the instant invention thus generally contain from about 20 to about 85 weight percent of component (i), from about 10 to about 75 weight percent of component (ii), from about 2 to about 25 weight percent of component (iii), and from about 1 to about 20 weight percent of component (iv); preferably from about 25 to about 80 weight percent (i), from about 15 to about 70 weight percent of (ii), from about 4 to about 20 weight percent of (iii), and from about 2 to about 15 weight percent of (iv); and more preferably from about 30 to about 70 weight percent of (i), from about 20 to about 60 weight percent of (ii), from about 5 to about 15 weight percent of (iii), and from about 3 to about 10 weight percent of (iv). Weight percent is measured based on the totals of components (i)-(iv) present in the instant compositions.

The compositions of the instant invention may optionally have admixed therewith the commonly known and used additives such as, for example, antioxidants; mold release agents; inert fillers such as glass fibers, glass spheres, talc, mica, clay, and graphite; ultraviolet radiation stabilizers such as the benzophenones, benzotriazoles, cyanoacrylates, benzylidene malonates; hydrolytic stabilizers such as the epoxides disclosed in U.S. Pat. Nos. 3,489,716, 4,138,379 and 3,839,247, all of which are hereby incorporated herein by reference; color stabilizers such as the organophosphites disclosed in U.S. Pat. Nos. 3,305,520 and 4,118,370, both of which are hereby incorporated herein by reference; and flame retardants.

Some particularly useful flame retardants are the alkali and alkaline earth metal salts of organic sulfonic acids. These types of flame retardants are disclosed, inter alia, in U.S. Pat. Nos. 3,933,734, 3,948,851, 3,926,908, 3,919,167, 3,909,490, 3,953,396, 3,931,100, 3,978,024, 3,953,399, 3,917,559, 3,951,910 and 3,940,366, all of which are incorporated herein by reference. These flame retardant compounds are present in amounts effective to render the instant compositions flame retardant. In general these amounts range from about 0.01 to about 10 weight percent, based on the total of flame retardant and components (i)–(iv).

DESCRIPTION OF THE PREFERRED EMBODIMENTS

In order that those skilled in the art may better understand how the instant invention may be practiced, the following examples are given by way of illustration and not by way of limitation. In the examples all parts and percentages are parts and percentages by weight, unless otherwise specified.

The following examples illustrate compositions falling outside the scope of the instant invention. They are presented for comparative purposes only.

EXAMPLE 1

A composition containing 85 parts by weight of a copolyester-carbonate resin derived from bisphenol-A, phosgene, and a mixture of isophthaloyl dichloride and terephthaloyl dichloride, containing 75 mole percent ester, 93 mole percent of said ester being isophthalate and 7 mole percent of said ester being terephthalate, 10 parts by weight of a selectively hydrogenated styrene-butadiene-styrene block copolymer (Shell Chemical Kraton G-1651), and 5 parts by weight of ethylene ethyl acrylate copolymer was prepared by blending the ingredients together by mechanically mixing them in a laboratory tumbler. The resulting mixture was fed to an extruder operating at a temperature of about 288° C. The extrudate was comminuted into pellets and the pellets were injection molded at about 300° C. to about 340° C. into test specimens measuring 63.5 mm×12.7 mm×3.2 mm thick and 63.5 mm×12.7 mm×6.4 mm thick.

EXAMPLE 2

A composition and test samples are prepared substantially in accordance with the procedure of Example 1 except that the 85 parts by weight of the copolyester-carbonate resin is replaced with 85 parts by weight of a polycarbonate resin derived from bisphenol-A and phosgene and having an intrinsic viscosity in methylene chloride at 25° C. of from about 0.45 to about 0.49 dl./gm.

The following examples illustrate compositions falling within the scope of the instant invention.

EXAMPLE 3

A composition and test specimens were prepared substantially in accordance with the procedure of Example 1 except that the 85 parts by weight of copolyester-carbonate resin were replaced with 51 parts by weight of the copolyester-carbonate resin and 34 parts by weight of the polycarbonate resin of Example 2.

EXAMPLE 4

A composition and test specimens were prepared substantially in accordance with the procedure of Example 1 except that the 85 parts by weight of copolyester-carbonate resin were replaced with 42.5 parts by weight of the copolyester-carbonate resin and 42.5 parts by weight of the polycarbonate resin of Example 2.

EXAMPLE 5

A composition containing 20 parts by weight of the copolyester-carbonate resin of Example 1, 68 parts by weight of the polycarbonate resin of Example 2, 8 parts by weight of Kraton G-1651, and 4 parts by weight of ethylene propylene ethylidene norbornene terpolymer (Exxon Vistalon 3708) was prepared by blending the ingredients together by mechanically mixing them in a laboratory tumbler. The resulting mixture was fed to an extruder operating at about 288° C. The extrudate was comminuted into pellets and the pellets were injection molded at about 300° C. to about 340° C. into test specimens measuring 63.5 mm×12.7 mm×3.2 mm thick and 63.5 mm×12.7 mm×6.4 mm thick.

EXAMPLE 6

A composition and test specimens were prepared substantially in accordance with the procedure of Example 5 except that the 20 parts by weight of copolyester-carbonate resin were replaced with 30 parts by weight of copolyester-carbonate resin and the 68 parts by weight of polycarbonate resin were replaced with 58 parts by weight of polycarbonate resin.

EXAMPLE 7

A composition containing 30 parts by weight of the copolyester-carbonate resin of Example 1, 55 parts by weight of the polycarbonate resin of Example 2, 10 parts by weight of Kraton G-1651, and 5 parts by weight of Vistalon 3708 was prepared by blending the ingredients together by mechanically mixing them in a laboratory tumbler. The resulting mixture was fed to an extruder operating at a temperature of about 288° C. The extrudate was comminuted into pellets and the pellets were injection molded at about 300° C. to about 340° C. into test specimens measuring 63.5 mm×12.7 mm×3.2 mm thick and 63.5 mm×12.7 mm×6.4 mm thick.

Some of the test specimens from Examples 1–7 were mounted on an ASTM stress jig (1% strain/240 kg$_f$/cm.$^2$) and soaked for two hours in AMOCO premium unleaded gasoline. These specimens were removed from the jig, the gasoline allowed to evaporate at room temperature for 24 hours, and then tested. These specimens were subjected to the Notched Izod impact test, ASTM D256, and the results are set forth in Table I. Other specimens from Examples 1–7 were subjected to the Notched Izod test without having been soaked in gasoline. The results of these tests are also set forth in Table I. Some of the unsoaked test specimens were also tested to determine their Heat Distortion Temperature Under Load (DTUL) in accordance with ASTM D648. The results of these tests are likewise set forth in Table I.

In Table I the numerical superscripts indicate the percent of test specimens which were ductile in failure, no superscript indicating 100% ductility.

For comparative purposes test specimens were prepared from an unmodified copolyester-carbonate resin of the type utilized in Example 1 substantially in accordance with the procedure of Example 1. These test specimens, which were prepared from the copolyester-carbonate resin alone, were subjected to the Notched Izod test and their Heat Distortion Temperature Under Load was determined. The results of these tests are set forth in Table I under the designation A.

TABLE I

| Example No. | Before Soaking in Gasoline Notched Izod (kgf cm./cm.) | | After Soaking in Gasoline Notched Izod (kgf cm./cm.) | | DTUL (°C.) |
|---|---|---|---|---|---|
| | 3.2 mm | 6.4 mm | 3.2 mm | 9.4 mm | |
| A | 49.0⁰ | 10.9⁰ | broke | | 163.5 |
| 1 | 34.3 | 29.9 | 33.2 | 29.9 | 160.1 |
| 2 | 74.0 | 65.3 | 72.9 | 65.3 | 137.6 |
| 3 | 55.0 | 46.3 | 52.8 | 42.5 | 150.5 |
| 4 | 65.3 | 45.7 | 65.3 | 45.7 | 142.9 |
| 5 | 72.4 | 64.8 | 27.2 | 38.6 | 141.3 |
| 6 | 72.4 | 61.0 | 39.7 | 37.0 | 146.4 |
| 7 | 69.1 | 57.2 | 56.1 | 40.8 | 140.9 |

As illustrated by the data in Table I the instant compositions (Examples 3–7) exhibit superior impact properties, i.e., impact strength and ductility, and superior resistance to gasoline than does copolyester-carbonate resin (Example A). As further shown by the data in Table I a composition containing no polycarbonate resin (Example 1) exhibits relatively poorer impact strength than do the instant compositions which contain the polycarbonate resin. Furthermore, the instant compositions exhibit relatively better resistance to organic solvents such as gasoline than does this polycarbonate free composition of Example 1. A composition which does not contain any copolyester-carbonate resin (Example 2), while exhibiting improved resistance to organic solvents also exhibits relatively poorer Heat Distortion Temperatures Under Load than do the instant compositions which contain the copolyester-carbonate component. Thus, the instant compositions exhibit improved resistance to organic solvents, improved impact properties, and relatively good thermal resistance.

It is the particular combination of components (i)–(iv) which results in the instant compositions exhibiting a particularly good mix of thermal resistance, impact properties, and resistance to organic solvents.

The foregoing detailed description has been given for clearness of understanding only and no unnecessary limitations are to be understood or implied therefrom. The invention is not limited to the exact details shown and described herein, for obvious modifications will occur to those skilled in the art.

What is claimed is:

1. Copolyester-carbonate composition exhibiting improved resistance to organic solvents and good thermal properties comprising, in admixture:
   (i) at least one high molecular weight thermoplastic aromatic copolyester-carbonate resin containing from about 25 to about 90 mole percent ester bonds;
   (ii) at least one high molecular weight thermoplastic aromatic polycarbonate resin;
   (iii) at least one selectively hydrogenated linear, sequential or radial teleblock copolymer of a vinyl aromatic compound (A) and (A') independently selected from styrene, alpha-methylstyrene, p-methylstyrene, vinyl toluene, vinyl xylene and vinyl naphthylene and an olefinic elastomer (B) of the type A-B-A', A-(B-A-B)$_n$-A, A(BA)$_n$B, (A)$_4$B, B(A)$_4$ or B(AB)$_n$B)$_4$ wherein n is an integer having a value of from 1 to 10 inclusive; and
   (iv) at least one polymer selected from an olefin acrylate copolymer, an ethylene propylene diene terpolymer, or mixtures thereof; components (ii)–(iv) being present in an amount at least effective to improve the resistance to organic solvents of said copolyester-carbonate resin but insufficient to substantially deleteriously affect the thermal properties thereof.

2. The composition of claim 1 which contains from about 10 to about 75 weight percent of (ii), from about 2 to about 25 weight percent of (iii), and from about 1 to about 20 weight percent of (iv).

3. The composition of claim 2 which contains from about 20 to about 85 weight percent of said copolyester-carbonate resin.

4. The composition of claim 3 which contains from about 15 to about 70 weight percent of component (ii), from about 4 to about 20 weight percent of component (iii), and from about 2 to about 15 weight percent of component (iv).

5. The composition of claim 4 which contains from about 25 to about 80 weight percent of said copolyester-carbonate resin.

6. The composition of claim 5 which contains from about 20 to about 60 weight percent of component (ii), from about 5 to about 15 weight percent of component (iii), and from about 3 to about 10 weight percent of component (iv).

7. The composition of claim 6 which contains from about 30 to about 70 weight percent of said copolyester-carbonate resin.

8. The composition of claim 1 wherein (iv) is an olefin acrylate copolymer.

9. The composition of claim 8 wherein said olefin acrylate copolymer is a copolymer of an olefin and at least one of a $C_1-C_6$ alkyl acrylate, a $C_1-C_6$ alkyl methacrylate, acrylic acid, methacrylic acid, or mixtures thereof.

10. The composition of claim 9 wherein said olefin acrylate copolymer is a copolymer of an olefin and a $C_1-C_6$ alkyl acrylate.

11. The composition of claim 10 wherein said alkyl acrylate is ethyl acrylate.

12. The composition of claim 11 wherein said olefin is ethylene.

13. The composition of claim 12 wherein said olefin acrylate is ethylene ethyl acrylate.

14. The composition of claim 1 wherein (iv) is an ethylene propylene diene terpolymer.

15. The composition of claim 14 wherein said ethylene propylene diene terpolymer is ethylene propylene norbornene terpolymer.

16. The composition of claim 15 wherein said ethylene propylene norbornene terpolymer is ethylene propylene ethylidene norbornene terpolymer.

17. The composition of claim 1 wherein in said selectively hydrogenated block copolymer (iii) (B) is selected from butadiene, isoprene, 1,3-pentadiene, and 2,3-dimethyl-butadiene.

18. The composition of claim 17 wherein in said selectively hydrogenated block copolymer (iii) (A) is a styrene block, (B) is a diolefin block, and (A') is a styrene block.

19. The composition of claim 18 wherein in said selectively hydrogenated block copolymer (iii) terminal blocks (A) and (A') each have a weight average molecular weight of about 2,000 to about 60,000, and center block (B) has a weight average molecular weight of from about 20,000 to about 450,000.

20. The composition of claim 1 wherein said polycarbonate resin (ii) is derived from at least one dihydric phenol and a carbonate precursor.

21. The composition of claim 20 wherein said carbonate precursor is phosgene.

22. The composition of claim 21 wherein said dihydric phenol is bisphenol-A.

23. The composition of claim 1 wherein said copolyester-carbonate resin (i) is derived from at least one dihydric phenol, a carbonate precursor, and at least one ester precursor.

24. The composition of claim 23 wherein said copolyester-carbonate resin has an ester content of from about 70 to about 80 mole percent.

25. The composition of claim 24 wherein said dihydric phenol is bisphenol-A.

26. The composition of claim 25 wherein said ester precursor is selected from isophthaloyl dichloride, terephthaloyl dichloride, and mixtures thereof.

27. The composition of claim 26 wherein said ester content is comprised of from about 1 to about 10 mole percent of the residue of terephthaloyl dichloride and from about 90 to about 99 mole percent of the residue of isophthaloyl dichloride.

28. The composition of claim 27 wherein said carbonate precursor is phosgene.

29. The composition of claim 1 which further contains a flame retardant amount of a flame retardant compound.

30. The composition of claim 29 wherein said flame retardant compound is selected from the alkali and alkaline earth metal salts of organic sulfonic acids.

* * * * *